US007315622B2

United States Patent
Mani et al.

(10) Patent No.: US 7,315,622 B2
(45) Date of Patent: Jan. 1, 2008

(54) ROBUST METHOD FOR ACHIEVING AUDIO/VIDEO SYNCHRONIZATION IN MPEG DECODERS IN PERSONAL VIDEO RECORDING APPLICATIONS

(75) Inventors: Murali Mani, Chappaqua, NY (US); Ramanathan Meenakshisundaram, Ossining, NY (US); Rogatus Hubertus Hermanus Wester, XV Waalre (NL); Auke van der Schaar, Ossining, NY (US)

(73) Assignee: NXP B.V., Eindhoven (NL)

( * ) Notice: Subject to any disclaimer, the term of this patent is extended or adjusted under 35 U.S.C. 154(b) by 804 days.

(21) Appl. No.: 10/183,798

(22) Filed: Jun. 27, 2002

(65) Prior Publication Data

US 2004/0001591 A1  Jan. 1, 2004

(51) Int. Cl.
*H04N 7/167* (2006.01)
(52) U.S. Cl. ..................................... 380/210
(58) Field of Classification Search ................ 380/200, 380/210, 236; 713/178, 400, 500
See application file for complete search history.

(56) References Cited

U.S. PATENT DOCUMENTS 6,728,271 B1 *  4/2004  Kawamura et al. ......... 370/536
6,850,619 B1 *  2/2005  Hirai .......................... 380/203
6,868,096 B1 *  3/2005  Hayashi ...................... 370/535
6,928,165 B1 *  8/2005  Takai .......................... 380/201

OTHER PUBLICATIONS

A.S. Schaar et al, "Robust Method fro Recovering a Program Time Base in MPEG-2 Transport Streams and Achieving Audio/Video Synchronization", filed Sep. 29, 2001, U.S. Appl. No. 09/967,877.

* cited by examiner

*Primary Examiner*—Gilberto Barron
*Assistant Examiner*—Ali S Abyaneh

(57) ABSTRACT

A receiver for receiving an MPEG encrypted transport stream and outputting audio and video signals comprising: a decryptor adapted to receive and decrypt the encrypted transport stream; a de-multiplexer adapted to convert the decrypted transport stream to audio and video elementary streams and to change the values in presentation time stamp and decoding time stamp fields of each packet of the audio and elementary streams to match the time of a receiver record clock; a storage sub-system adapted to store the audio and the video elementary streams and to change the values in the presentation time stamp and decoding time stamp fields of each header of the audio and video elementary streams to compensate for the amount of time the audio and video elementary streams are stored; and audio and video decoders to decode the audio and video elementary streams respectively.

20 Claims, 3 Drawing Sheets

ROBUST METHOD FOR ACHIEVING AUDIO/VIDEO SYNCHRONIZATION IN MPEG DECODERS IN PERSONAL VIDEO RECORDING APPLICATIONS

CROSS REFERENCE TO RELATED APPLICATIONS

This application is related by common inventorship and subject matter to co-pending applications titled "Robust Method For Recovering A Program Time Base In MPEG-2 Transport Streams And Achieving Audio/Video Synchronization" Ser. No. 09/967,877 which is hereby incorporated in its entirety by reference.

FIELD OF THE INVENTION

The present invention relates to the field of recording and playback of broadcast streams; more specifically, it relates to an apparatus and method for synchronizing the decoding and presentation of video and audio from a broadcast stream in a video recording environment.

BACKGROUND OF THE INVENTION

The Moving Picture Experts Group phase 2 (MPEG-2) standard is a digital audio/video (A/V) compression standard employed in a variety of audio/video distribution systems including, for example, Digital Satellite System (DSS) broadcasting. The MPEG-2 transport standard, ISO 13818-1, requires the broadcaster to transmit a program clock reference (PCR) time stamp within the multiplexed audio and video packet stream at periodic intervals. This program clock reference time stamp, referred to as a system clock reference (SCR) in the DSS program stream, bears a strict relationship to the system time clock(s) (STC) within the MPEG-2 encoder generating the broadcast stream, and therefore may be employed to replicate the encoder's system time clock in the decoding equipment. Additionally, each audio and video packet multiplexed into the MPEG-2 broadcast stream contains a decoding time stamp (DTS) and a presentation time stamp (PTS), which identify the times, relative to the program clock reference, at which the packet must be decoded and presented by the decoding equipment for display, respectively.

Implementation of personal video recording (PVR) involves storing the broadcast programs on storage media and then playing them back. If the programs are stored in their entirety, as MPEG-2 streams and played back by injection at the original broadcasters bit-rate, the timing information is retained allowing the delayed program to use the same audio/video synchronization mechanism as the live broadcast. Storage of MPEG-2 streams in their entirety requires prohibitively large amounts of storage, However, if the MPEG-2 streams are altered or compressed by discarding programs or if programs are altered or compressed by discarding sub-channels, storage requirements are reduced but the critical timing of the arrival of the PCRs is lost. Storage of only audio elementary streams (AES) and video elementary streams (VES) also reduces storage requirements but again results in loss of the PCR arrival timing. Loss of the PCR arrival timing results in serious audio/video synchronization problems evident in such phenomenon as noise, breaks or pauses in the audio/video presentation during playback.

SUMMARY OF THE INVENTION

A first aspect of the present invention is a receiver for receiving an MPEG encrypted transport stream and outputting audio and video signals comprising: a decryptor adapted to receive the encrypted transport stream, to decrypt the encrypted transport stream and to output the decrypted transport stream; a de-multiplexer adapted to receive the decrypted transport stream, adapted to convert the decrypted transport stream to an audio elementary stream and a video elementary stream and adapted to change the values in presentation time stamp and decoding time stamp fields of each header of each packet of the audio elementary stream and of the video elementary stream to match the time of a receiver record clock and adapted to output the audio elementary stream and the video elementary stream; a storage sub-system adapted to receive and store the audio elementary stream and the video elementary stream, adapted to change the values in the presentation time stamp and decoding time stamp fields of each header of each packet of the audio elementary stream and of the video elementary stream to compensate for the amount of time the audio elementary stream and of the video elementary stream are stored in the storage sub-system; an audio decoder adapted to receive and to decode the audio elementary stream and adapted to output an audio signal; and a video decoder adapted to receive and to decode the video elementary stream and adapted to output a video signal.

A second aspect of the present invention is a receiver for receiving an MPEG encrypted transport stream and outputting audio and video signals, comprising: a decryptor adapted to receive the encrypted transport stream, decrypt the encrypted transport stream and output the decrypted transport stream; a selector adapted to receive the decrypted transport stream, adapted to select packets associated with one or more programs and adapted to create a partial transport containing only packets associated with the one or more programs, adapted to add a time stamp based on a receiver record clock to each packet in the partial transport stream and adapted to output the partial transport stream; a storage sub-system adapted to receive and store the partial transport stream; a de-multiplexer adapted to receive the partial transport stream, adapted to convert the partial transport stream to an audio elementary stream and a video elementary stream, adapted to change the values in presentation time stamp and decoding time stamp fields of each header of each packet of the audio elementary stream and of the video elementary stream to compensate for the amount of time the partial transport stream is stored in the storage sub-system; an audio decoder adapted to receive and to decode the audio elementary stream and output an audio signal; and a video decoder adapted to receive and to decode the video elementary stream and output a video signal.

A third aspect of the present invention is a method of synchronization of audio and video in an MPEG decoder comprising: decrypting a transport stream; de-multiplexing the transport stream; extracting the value of a first program clock reference field from the header of a first packet associated with a program in the transport stream; de-multiplexing the transport stream into an audio elementary stream and a video elementary stream; adding a difference between a current time and a value of a first program clock reference field in the header of a packet in the decrypted transport stream, the packet associated with a program to be stored to each presentation time stamp field and each decoding time stamp field of each header of each packet in the audio and video elementary streams associated with the program to be stored; storing the audio and video elementary streams; upon reading out the audio and video elementary streams, adding a difference between a time when the audio and video elementary streams were stored and a play time when the audio and video elementary streams are read out of storage to each presentation time stamp field and each decoding time stamp field of each header of each packet in the audio and video elementary streams; and decoding the audio and video elementary streams.

A fourth aspect of the present invention is a method of synchronization of audio and video in an MPEG decoder comprising: decrypting a transport stream; selecting packets associated with one or more programs and creating a partial transport containing only packets associated with the one or more programs; adding a time stamp based on a current record time to each header of each packet in the partial transport stream; storing the partial transport stream; reading out partial transport stream; de-multiplexing the partial transport stream into an audio elementary stream and a video elementary stream; adding a difference between a value of a first program clock reference field in the header of a packet in the decrypted transport stream, the packet associated with a program to be stored, and a current time to each presentation time stamp field and each decoding time stamp field of each header of each packet in the audio and video elementary streams; and decoding the audio and video elementary streams.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

For the purposes of the present invention, it should be understood, unless otherwise noted, the term transport stream (TS) refers to an MPEG TS, the term program stream (PS) refers to an MPEG PS and the term packetized elementary stream (PES) refers to an MPEG PES. The term MPEG represents MPEG-1, MPEG-2, MPEG-4, MPEG-7 and other MPEG standard formats having the same or similar MPEG-2 stream, packet and field structures. The term MPEG also represents DDS streams where the stream, packet and field structures are the same or similar to MPEG-2 stream, packet and field structures but have different names.

Figure 1:
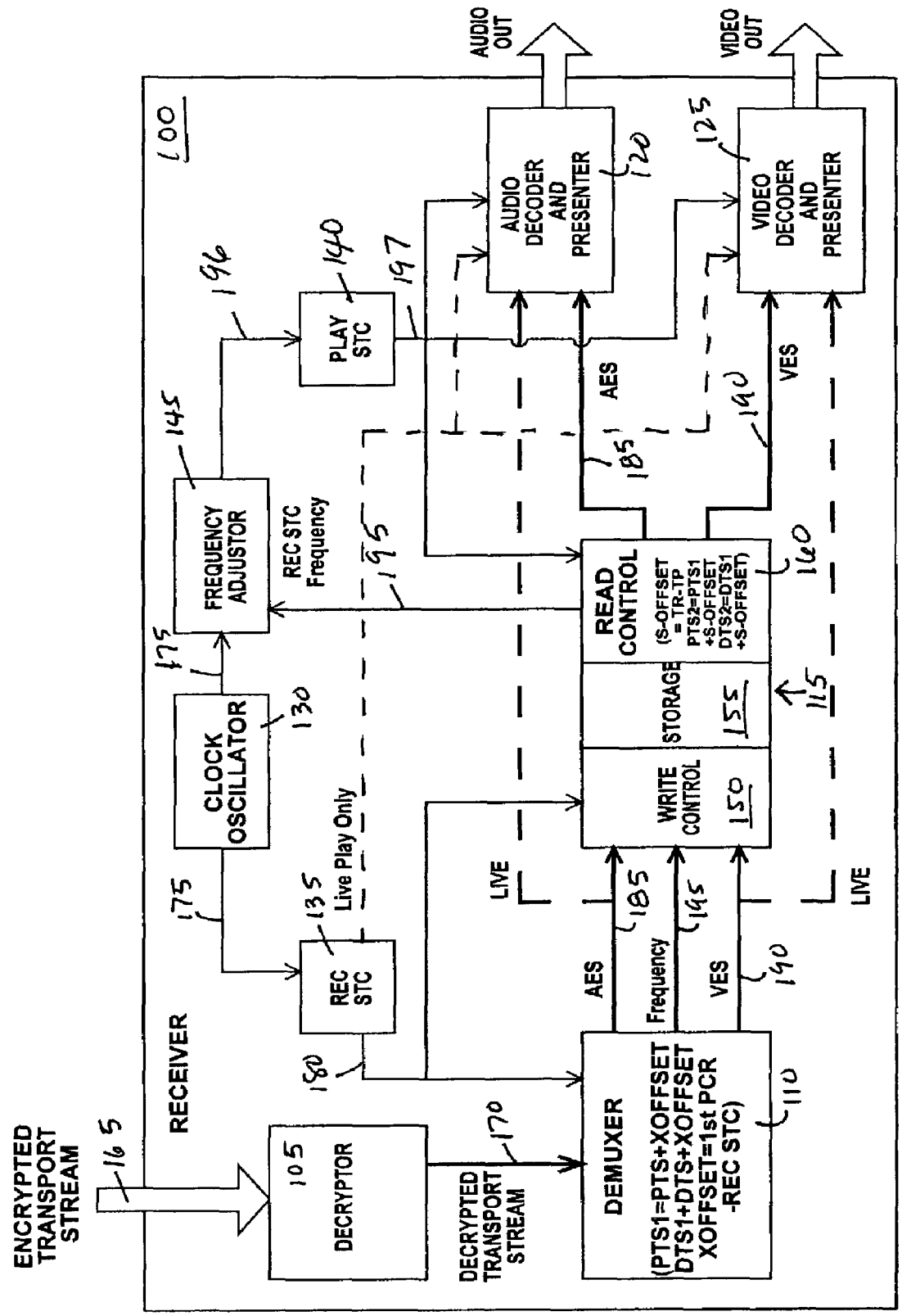
FIG. 1 is a schematic diagram of a receiver according to a first embodiment of the present invention.

FIG. 1 is a schematic diagram of a receiver according to a first embodiment of the present invention. In FIG. 1, receiver 100 includes a decryptor 105, a de-multiplexer 110, a storage subsystem 115, an audio decoder and presenter 120, a video decoder and presenter 125, a clock oscillator circuit 130, a record STC 135, a play STC 140 and a frequency adjustment circuit 145. Storage subsystem 115 includes a write controller 150, a storage medium 155 and a read controller 160.

In operation, an encrypted transport stream (TS) 165 is received by decryptor 105 and decryptor 105 outputs a decrypted transport stream 170 that is received by de-multiplexer 110 at the rate at which encrypted transport stream 165 is broadcast. PLL circuit 130 generates a fixed frequency signal 175 that is sent to record STC 135 and to frequency adjustor 145 as well. A record clock signal 180 generated by record STC 135 is received by de-multiplexer 110 and write controller 150. De-multiplexer 110 extracts the value of the first PCR field in the first header of the decrypted transport stream and calculates an X-offset between the encoders system time clock frequency (the clock used create the original value in the SCR field of the program stream and to create the original value in the PCR field of the transport stream) and the frequency of record STC 135. This operation may be expressed as X-offset=1st PCR−REC STC.

De-multiplexer 110 converts decrypted transport stream 170 into an audio elementary stream (AES) 185 and a video elementary stream (VES) 190. AES 185 and VES 190 are in PES format. Decrypted transport stream 170 may be decomposed into other streams besides audio and video, for example teletext, as well. These other streams would be treated identically as AES 185 and VES 190. De-multiplexer 110 adds the X-offset to the original PTS field(s) value PTS to create a new value PTS1 and writes PTS1 in the PTS field(s) of AES 185 and VES 190. De-multiplexer 110 also adds the X-offset to the original DTS field(s) value DTS to create a new value DTS1 and writes DTS1 in the DTS field(s) of AES 185 and VES 190. These two operations may be expressed as PTS1=PTS+X-offset and DTS1=DTS+X-offset. AES 185 and VES 190 along with a record STC frequency signal 195 are sent to write controller 150 of storage subsystem 150. Record STC frequency signal 195 carries the value of record STC 135 frequency when the X-offset was calculated.

Write controller 150 interleaves all elementary stream information (AES 185, VES 190, frequency signal 195) pertaining to the same time as a single segment and stores the segment on storage medium 155.

Receiver 100 can play programs in two modes, live play mode or delayed play or time shift recording (TSR) mode. In live play mode the program is not stored. In live play mode, receiver 100 "hotwires" AES 185 to audio decoder and presenter 120 and "hotwires" VES 190 to video decoder and presenter 125 as illustrated by the dashed lines. Video decoder and presenter 125 acts as the "master" and pulls segments from de-multiplexer 110 based upon the time of record STC 135 and the PTS fields (containing the value PST1) and the DTS fields (containing the value DTS1) of AES 185 and VES 190.

In delayed play mode the program is stored and played back under control of storage subsystem 115. For delayed playback mode, read controller 160 of storage subsystem 115 reads and sends the stored frequency signal 195 to frequency adjustor 145 which adjusts fixed frequency signal 175 to match stored frequency signal 195 and outputs an adjusted fixed frequency signal 196. Adjusted fixed frequency signal 196 is received by play STC 140 that sends a play clock signal 197 to audio decoder and presenter 120 and video decoder and presenter 125 and read controller 160. Thus, play STC 140 is running at the same frequency as record STC 135 was running at when the program was de-multiplexed.

For delayed playback mode read controller 160 calculates a storage offset (S-offset) as the difference in time according to play STC 140 at pause (TP) and the time according to the play STC at resume (TR). This operation may be expressed as S-offset=TR−TP. Read controller 160 adds the S-offset to the current PTS field(s) value PTS1 to create a new value PTS2 and writes PTS2 in the PTS field(s) of AES 185 and VES 190. Read controller 160 also adds the S-offset to the current DTS field(s) value DTS1 to create a new value DTS2 and writes DTS2 in the DTS field(s) of AES 185 and VES 190. These two operations may be expressed as PTS2=PTS1+S-offset and DTS2=DTS1+S-offset. Video decoder and presenter 125 acts as the "master" and pulls segments from storage subsystem 115 at the rate which it is presented by the storage subsystem.

Figure 2:
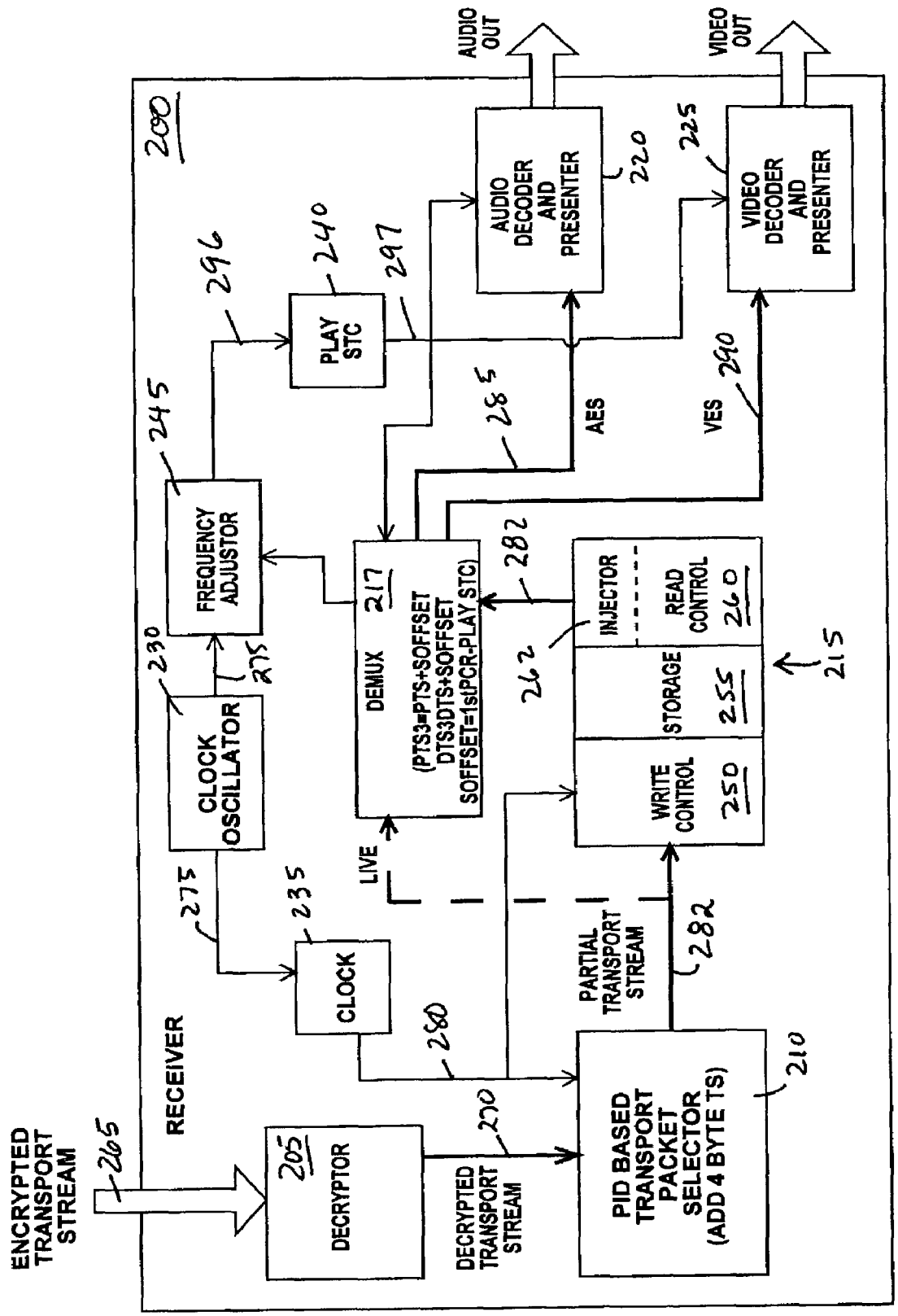
FIG. 2 is a schematic diagram of a receiver according to a second embodiment of the present invention.

FIG. 2 is a schematic diagram of a receiver according to a second embodiment of the present invention. In FIG. 2, receiver 200 includes a decryptor 205, a packet ID (PID) based transport packet selector 210 (hereafter referred to as selector 210), a storage subsystem 215, a de-multiplexer 217, an audio decoder and presenter 220, a video decoder and presenter 225, a clock oscillator circuit 230, a free running clock 235, a play STC 240 and a frequency adjustment circuit 245. Storage subsystem 215 includes a write controller 250, a storage medium 255 and a read controller 260. Read controller 260 contains an optional injector 262. Injector 262 may be a hardware or software injector.

In operation, an encrypted transport stream 265 is received by decryptor 205 and decryptor 205 outputs a decrypted transport stream 270 that is received by selector 210 at the rate at which encrypted transport stream 265 is broadcast. PLL circuit 230 generates a fixed frequency signal 275 that is sent to clock 235 and to frequency adjustor 245 as well. A clock signal 280 generated by clock 235 is received by selector 210 and write controller 250. Selector 210 extracts packets based on a selected program(s) from decrypted transport stream 270. Selection is based upon values in the PID field of each packet header in the decrypted transport stream that correspond to the selected program(s). Selector 210 adds a four-byte timestamp at the beginning of each selected packet to produce a partial transport stream 282 which is received by write controller 250 of storage sub-system 215. Write controller 250 places partial transport stream into storage medium 255.

Receiver 200 can play programs in two modes, live play mode or delayed play or TSR mode. In live playback mode the program is not stored and receiver 200 "hotwires" selector 210 to de-multiplexer 217 and sets the S-offset (described infra) to zero as illustrated by the dashed lines.

In delayed play mode the program is stored in storage sub-system 215. For delayed play mode, de-multiplexer 217 performs several operations as now described. The order in which the operations are described is not necessarily the order in which they are carried out.

There are two options for sending partial transport stream 282 to de-multiplexer 217 from storage-sub-system 215. In the first or "push" option, injector 262 reads the four-byte time stamp and "injects" each packet at the proper time into de-multiplexer 217. In the push option, de-multiplexer 217 removes the four-byte time stamp from each packet as the packets are received. In the second or "pull" option injector 262 is not used (or not present) and de-multiplexer 217 reads, removes the four byte time stamp from each packet as it receives. Video is "pulled" by video decoder and presenter 225 based upon consumption of the VES. When the amount of VES data in a buffer (not shown) of video decoder and presenter 225 falls below a threshold value, more data is "pulled" from de-multiplexer 217 by the video decoder and presenter.

De-multiplexer 217 calculates a storage offset (S-offset) as the difference in time between the value of the first PCR field in the first header of partial transport stream 282 and the current play STC 240 time. This operation may be expressed as S-offset=1st PCR−PLAY STC.

De-multiplexer 217 converts decrypted partial transport stream 282 into an AES stream and VES stream. The AES and VES streams are in PES format. Decrypted partial transport stream 282 may be decomposed into other streams besides audio and video, for example teletext, as well.

De-multiplexer 217, for each PES in the AES and VES, adds the S-offset to the current PTS field(s) value PTS to create a new value PTS3 and writes PTS3 in the PTS field(s) of the AES and VES. De-multiplexer 217, for each PES in the AES and VES, adds the S-offset to the current DTS field(s) value DTS to create a new DTS value DTS3 and writes DTS3 in the PTS field(s) of the AES and VES. These two operations may be expressed as PTS3=PTS+S-offset and DTS3=DTS+S-offset.

De-multiplexer 217 uses the PCRs with partial transport stream 282 and the four-byte time stamp of arriving transport packets to calculate and set the frequency of play STC 240 via frequency adjuster 245 which adjusts fixed frequency signal 275 to an adjusted fixed frequency signal 296. Adjusted fixed frequency signal 296 is received by play STC 240 which sends a play clock signal 297 to de-multiplexer 217, audio decoder and presenter 220 and video decoder and presenter 225. This operation is fully disclosed in the aforementioned related application "Robust Method For Recovering A Program Time Base In MPEG-2 Transport Streams And Achieving Audio/Video Synchronization" Ser. No. 09/967,877. Thus, play STC 240 is running at the same frequency as the program clock when the program stream was created.

Video decoder and presenter 225 acts as the "master" and pulls segments from storage de-multiplexer 217 at the rate which it is presented by the de-multiplexer.

When a user of the present invention causes either receiver 100 or receiver 200 to enter trick play mode (i.e. fast forward, fast reverse, slow forward, slow reverse or pause) the video stored on storage medium 155 or on storage medium 255 is presented at a rate selected by the user and there is no audio or audio need not be synchronized with video. In this case, for both embodiments of the present invention, the storage-offset is set to zero and STC 140 or play STC 240 is allowed to run at the last set frequency.

When a user of the present invention restores either receiver 100 or receiver 200 to the normal play modes (real-time play and delayed time play are normal modes) after trick play mode, the resultant situation may be considered as a discontinuity in the time base. In this case, for both embodiments the current PTS values in the PTS field of each PES packet is adjusted based upon a new offset. The new offset is a function of PTS field values and the current value of play STC 140 or play STC 240. This may be expressed as PTS4=PTS1+New Offset for the first embodiment of the present invention and as PTS5=PTS+New Offset for the second embodiment of the present invention. The determination of the New Offset is fully disclosed in the aforementioned related application "Robust Method For Recovering A Program Time Base In MPEG-2 Transport Streams And Achieving Audio/Video Synchronization" Ser. No. 09/967,877.

Figure 3:
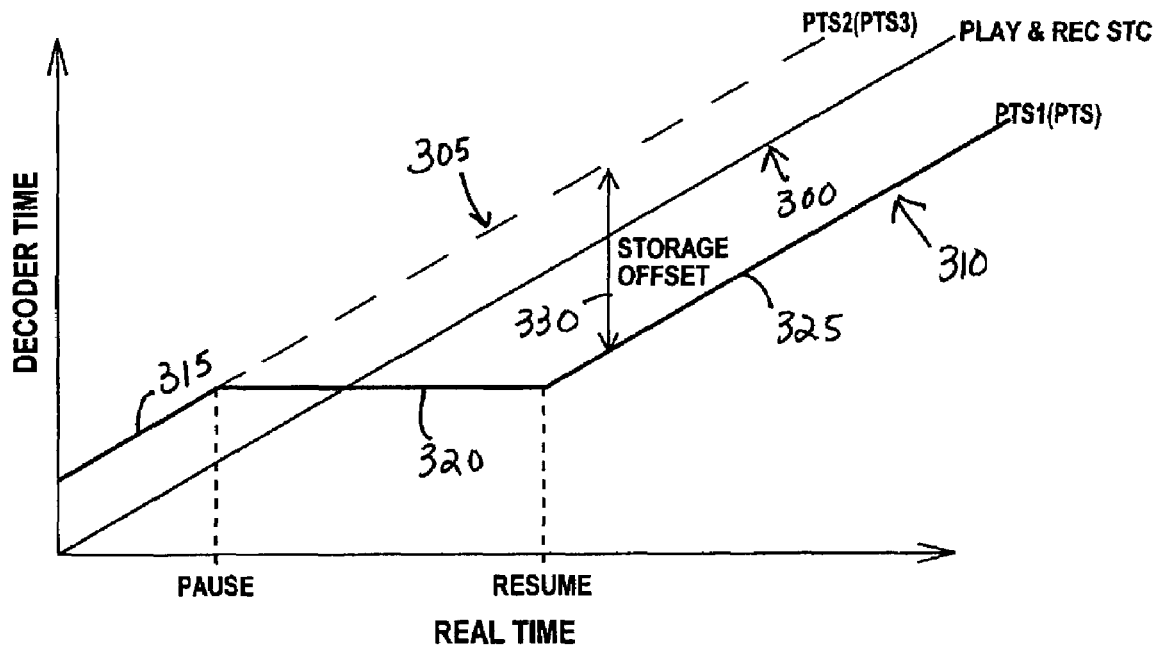
FIG. 3 is a plot illustrating the relationship, during recording, of the receivers playback and record STCs and the PTSs modified according to the present invention.

FIG. 3 is a plot illustrating the relationship, during recording, of the receivers playback and record STCs and the PTSs modified according to the present invention. In FIG. 3, the vertical axis is time as seen by audio and video decoders and presenters 120 and 125 (see FIG. 1) or audio and video decoders and presenters 220 and 225 (see FIG. 2) and the horizontal axis is real time. As shown in FIG. 3, values of play STC and record STC curve 300 increase linearly at a fixed rate. PTS curve 305 illustrates the required increase of PTS values within the AES and VES to avoid video or audio discontinuities in the presented program. The slope of PTS curve 305 must be identical in slope, though it may be offset in decoder time from play STC and record STC curve 300. PTS curve 310 illustrates the PTS values of the recorded AES and VES (or in the case of the second embodiment, the PTS values of the AES and VES derived from the stored partial transport stream. In a first section 315 of PTS curve 310, PTS curve 310 overlaps PTS curve 305 and the presented audio and video is correctly timed. Section 315 is live play. In a second section 320 of PTS curve 310, the program is paused and is treated as if a discontinuity has occurred. The PTS values in section 320 do not increase, as long as the program is paused, When play is resumed as in third section 325 of PTS curve 310, there is an offset 330 between PTS curve 305 and PTS curve 310. The slope of PTS curves 305 and 310 are the same, but they are offset in decoder time. Offset 330 is due to the time elapsed in pausing (storage) and is corrected for by the present invention by adjusting the PTS values to compensate for the storage time as described supra. DTS values would plot similarly to their respective PTS values.

Figure 4:
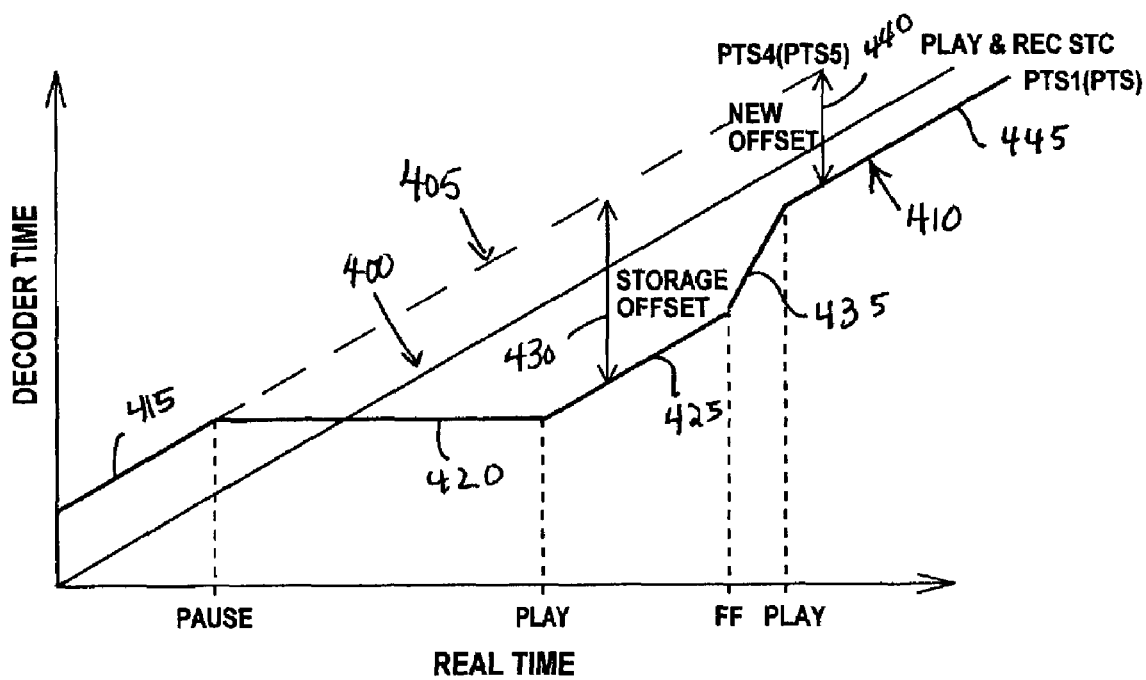
FIG. 4 is a plot illustrating the relationship, during trick to normal play, of the receivers playback and record STCs, the original PTS and the PTSs modified according to the present invention.

FIG. 4 is a plot illustrating the relationship, during trick to normal play, of the receivers playback and record STCs, the original PTS and the PTSs modified according to the present invention. In FIG. 4, the vertical axis is time as seen by audio and video decoders and presenters 120 and 125 (see FIG. 1) or audio and video decoders and presenters 220 and 225 (see FIG. 2) and the horizontal axis is real time. As shown in FIG. 4, values of play STC and record STC curve 400 increase linearly at a fixed rate. PTS curve 405 illustrates the required increase of PTS values within the AES and VES to avoid video or audio discontinuities in the presented program. The slope of PTS curve 405 must be identical in slope, though it may be offset in decoder time from play STC and record STC curve 400. PTS curve 410 illustrates the PTS values of the recorded AES and VES (or in the case of the second embodiment, the PTS values of the AES and VES derived from the stored partial transport stream. In a first section 415 of PTS curve 410, PTS curve 410 overlaps PTS curve 405 and the presented audio and video is correctly timed. Section 415 is live play. In a second section 420 of PTS curve 410, the program is paused and is treated as if a discontinuity has occurred. The PTS values in section 420 do not increase as long as the program is paused. When play is resumed as in third section 425 of PTS curve 410, there is an offset 430 between PTS curve 405 and PTS curve 410. The slope of PTS curves 405 and 410 are the same, but they are offset in decoder time. Offset 430 is due to the time elapsed in pausing (storage) and is corrected for by the present invention by adjusting the PTS values to compensate for the storage time as described supra. In a fourth section 435 of PTS curve 410, a trick play is performed, in the present example, fast forward, and is treated as a discontinuity. In the fourth section 435 of PTS curve 410, maintaining timing is not required due to the very nature of trick play distorting timing. However, after exiting trick play mode as in fifth section 445 of PTS curve 410, there is an offset 440 between PTS curve 405 and PTS curve 410. The slope of PTS curves 405 and 410 are the same, but they are offset in decoder time. Offset 440 is due to the time distortion caused by the trick play is also corrected for by the present invention by adjusting the PTS values to compensate for the storage time as described supra. DTS values would plot similarly to their respective PTS values.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A receiver for receiving an MPEG encrypted transport stream and outputting audio and video signals, comprising:
  a decryptor adapted to receive the encrypted transport stream, to decrypt the encrypted transport stream and to output a decrypted transport stream;
  a de-multiplexer adapted to receive the decrypted transport stream, adapted to convert the decrypted transport stream to an audio elementary stream and
  a video elementary stream and adapted to change values in presentation time stamp and decoding time stamp fields of each header of each packet of the audio elementary stream and of the video elementary stream to match time of a receiver record clock and adapted to output the audio elementary stream and the video elementary stream;
  a storage sub-system adapted to receive and store the audio elementary stream and the video elementary stream, adapted to change the values in the presentation time stamp and decoding time stamp fields of each header of each packet of the audio elementary stream and of the video elementary stream to compensate for an amount of time the audio elementary stream and of the video elementary stream are stored in the storage sub-system determined based on internal receiver times;
  an audio decoder adapted to receive and to decode the audio elementary stream and adapted to output an audio signal; and
  a video decoder adapted to receive and to decode the video elementary stream and adapted to output a video signal.

2. The receiver of claim 1, further including frequency adjusting means for adjusting the frequency of a receiver play clock to match the frequency of the receiver record clock.

3. The receiver of claim 2, wherein the storage sub-system adds the difference between a storage time on the receiver play clock when the audio and video elementary streams are stored in the storage sub-system and a play time on the receiver play clock when the audio and video elementary streams are read out of the storage sub-system to each presentation time stamp field and each decoding time stamp field of each header of each packet in the audio and video elementary streams.

4. The receiver of claim 1, wherein the de-multiplexer adds the difference in the value of a first program clock reference field in the header of a packet in the decrypted transport stream, the packet associated with a program to be stored, and the current time of the receiver record clock to each presentation time stamp field and each decoding time stamp field of each header of each packet in the audio and video elementary streams.

5. The receiver of claim 1, wherein the de-multiplexer is adapted to input the audio elementary stream directly to the audio decoder and to input the video elementary stream directly to the video decoder.

6. A receiver for receiving an MPEG encrypted transport stream and outputting audio and video signals, comprising:
  a decryptor adapted to receive the encrypted transport stream, decrypt the encrypted transport stream and output a decrypted transport stream;
  a selector adapted to receive the decrypted transport stream, adapted to select packets associated with one or more programs and adapted to create a partial transport containing only packets associated with the one or more programs, adapted to add a time stamp based on a receiver record clock to each packet in the partial transport stream and adapted to output the partial transport stream;

a storage sub-system adapted to receive and store the partial transport stream;

a de-multiplexer adapted to receive the partial transport stream, adapted to convert the partial transport stream to an audio elementary stream and a video elementary stream, adapted to change values in presentation time stamp and decoding time stamp fields of each header of each packet of the audio elementary stream and of the video elementary stream to compensate for an amount of time the partial transport stream is stored in the storage sub-system determined based on internal receiver times;

an audio decoder adapted to receive and to decode the audio elementary stream and output an audio signal; and a video decoder adapted to receive and to decode the video elementary stream and output a video signal.

7. The receiver of claim 6, further including frequency adjusting means for adjusting the frequency of a receiver play clock to match the frequency of the receiver record clock.

8. The receiver of claim 7, wherein the frequency adjusting means adjusts the frequency of the receiver play clock based upon the values of presentation time stamps fields of the headers of each packet in the partial transport stream and the current value of the receiver play clock.

9. The receiver of claim 6, wherein the de-multiplexer adds a difference in the value of a first program clock reference field in the header of a packet in the decrypted transport stream, the packet associated with a program to be stored, and the current time of the receiver record clock to each presentation time stamp field and each decoding time stamp field of each header of each packet in the audio and video elementary streams.

10. The receiver of claim 6, wherein the selector is adapted to input the partial transport stream directly to the de-multiplexer.

11. The receiver of claim 6, wherein the storage sub-system injects packets based upon the time stamp added to each packet of the partial transport stream.

12. A method of synchronization of audio and video in an MPEG decoder comprising the acts of:
decrypting a transport stream;
de-multiplexing the transport stream;
extracting a value of a first program clock reference field from the header of a first packet associated with a program in the transport stream;
de-multiplexing the transport stream into an audio elementary stream and a video elementary stream;
adding a difference between a current time and the value of a first program clock reference field in the header of a packet in the decrypted transport stream, the packet associated with a program to be stored to each presentation time stamp field and each decoding time stamp field of each header of each packet in the audio and video elementary streams associated with the program to be stored;
storing the audio and video elementary streams;
upon reading out the audio and video elementary streams, adding a difference determined based on internal receiver times between a time when the audio and video elementary streams were stored and a play time when the audio and video elementary streams are read out of storage to each presentation time stamp field and each decoding time stamp field of each header of each packet in the audio and video elementary streams; and
decoding the audio and video elementary streams.

13. The method of claim 12, further including the act of:
adjusting a frequency of the play time to match a frequency of the record time.

14. The method of claim 12, further including the act of:
upon resuming a normal rate of reading out after a change from the normal rate of reading out of the audio and video elementary streams, adding an offset based on values of the presentation time stamp field of the header of the audio elementary stream packets and the header of the video elementary stream packets and the current play time to each presentation time stamp field and each decoding time stamp field of each header of each packet in the audio and video elementary streams.

15. A method of synchronization of audio and video in an MPEG decoder comprising the acts of:
decrypting a transport stream;
selecting packets associated with one or more programs and creating a partial transport stream containing only packets associated with the one or more programs;
adding a time stamp based on a current receiver record time to each header of each packet in the partial transport stream;
storing the partial transport stream;
reading out partial transport stream;
de-multiplexing the partial transport stream into an audio elementary stream and a video elementary stream;
adding a difference between a value of a first program receiver clock reference field in the header of a packet in the decrypted transport stream, the packet associated with a program to be stored, and a current receiver time to each presentation time stamp field and each decoding time stamp field of each header of each packet in the audio and video elementary streams; and
decoding the audio and video elementary streams.

16. The method of claim 15, further including the acts of:
adjusting a frequency the play time to match a frequency of the record time.

17. The method of claim 16, wherein the frequency is adjusted based upon the values of presentation time stamps fields of the headers of each packet in the partial transport stream and the current play time.

18. The method of claim 15, further including the act of:
upon resuming a normal rate of reading out after a change from the normal rate of reading out of the audio and video elementary streams, adding an offset based values in the presentation time stamp field of the header of the audio elementary stream packets and the header of the video elementary stream packets and the current play time to each presentation time stamp field and each decoding time stamp field of each header of each packet in the audio and video elementary streams.

19. The method of claim 15, wherein the selecting is based on values in program ID fields of the headers of packets in the transport stream.

20. The receiver of claim 15, wherein a rate of reading out of the audio and video elementary streams is based upon the time stamp added to the header of each packet of the partial transport stream.

* * * * *